United States Patent [19]
Fujiwara

[11] Patent Number: 5,353,330
[45] Date of Patent: Oct. 4, 1994

[54] POWER CONSERVING MOBILE TELEPHONE USABLE AS A PORTABLE PHONE AND AS AN INSTALLED PHONE

[75] Inventor: Ryuhei Fujiwara, Tokyo, Japan

[73] Assignee: NEC Corporation, Tokyo, Japan

[21] Appl. No.: 831,431

[22] Filed: Feb. 5, 1992

[30] Foreign Application Priority Data

Feb. 6, 1991 [JP] Japan .................. 3-036849

[51] Int. Cl.⁵ .............. H04M 11/00; H04M 1/64; H04B 7/15; H04B 1/40
[52] U.S. Cl. ........................ 379/58; 379/59; 379/67; 455/11.1; 455/13.4; 455/88
[58] Field of Search .......... 379/58, 59, 67; 455/88, 455/11.1, 13.4

[56] References Cited

U.S. PATENT DOCUMENTS

| | | | |
|---|---|---|---|
| 4,908,846 | 3/1990 | Maru | 379/58 |
| 4,916,729 | 4/1990 | Usui | 379/58 |
| 4,961,212 | 10/1990 | Marui et al. | 379/67 |
| 4,962,523 | 10/1990 | Tanaka | 379/58 |
| 4,974,250 | 11/1990 | Tomiyori | 379/58 |
| 5,036,532 | 7/1991 | Metroka et al. | 379/58 |
| 5,042,063 | 8/1991 | Sakanishi et al. | 379/58 |
| 5,054,115 | 10/1991 | Sawa et al. | 379/61 |
| 5,148,471 | 9/1992 | Metroka et al. | 379/67 |

FOREIGN PATENT DOCUMENTS

61-077 4/1986 Japan .

Primary Examiner—Stephen Chin
Assistant Examiner—Vijay Shankar
Attorney, Agent, or Firm—Foley & Lardner

[57] ABSTRACT

A mobile telephone usable both as a portable and as an installed telephone, capable of saving battery power when used as a portable telephone, and safely starting up voice-dialing when used as an installed telephone. Discriminating circuit (3, 3A, 14) discriminates which use the telephone is now in, portable or installed. In the former use, start-up circuit (7, 15) is manually activated to supply power from battery pack (1) to voice-dialing unit (8). The power supply is cut off in response to reset signal R supplied from the voice-dialing unit when voice-dialing ends. In the latter use, voice-dialing unit is kept switched on to the vehicle battery and ready for start-up in response to voice input.

3 Claims, 2 Drawing Sheets

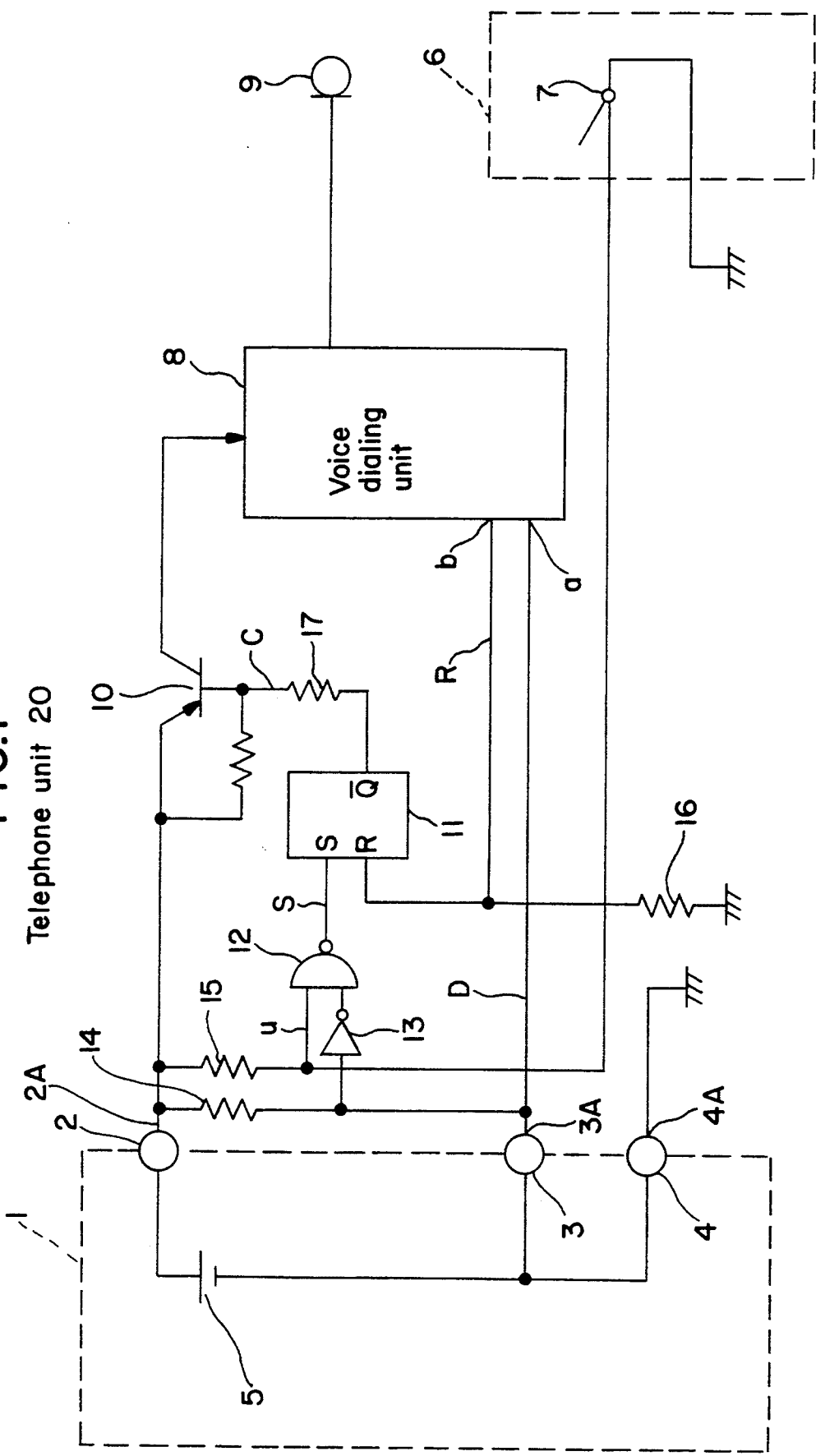

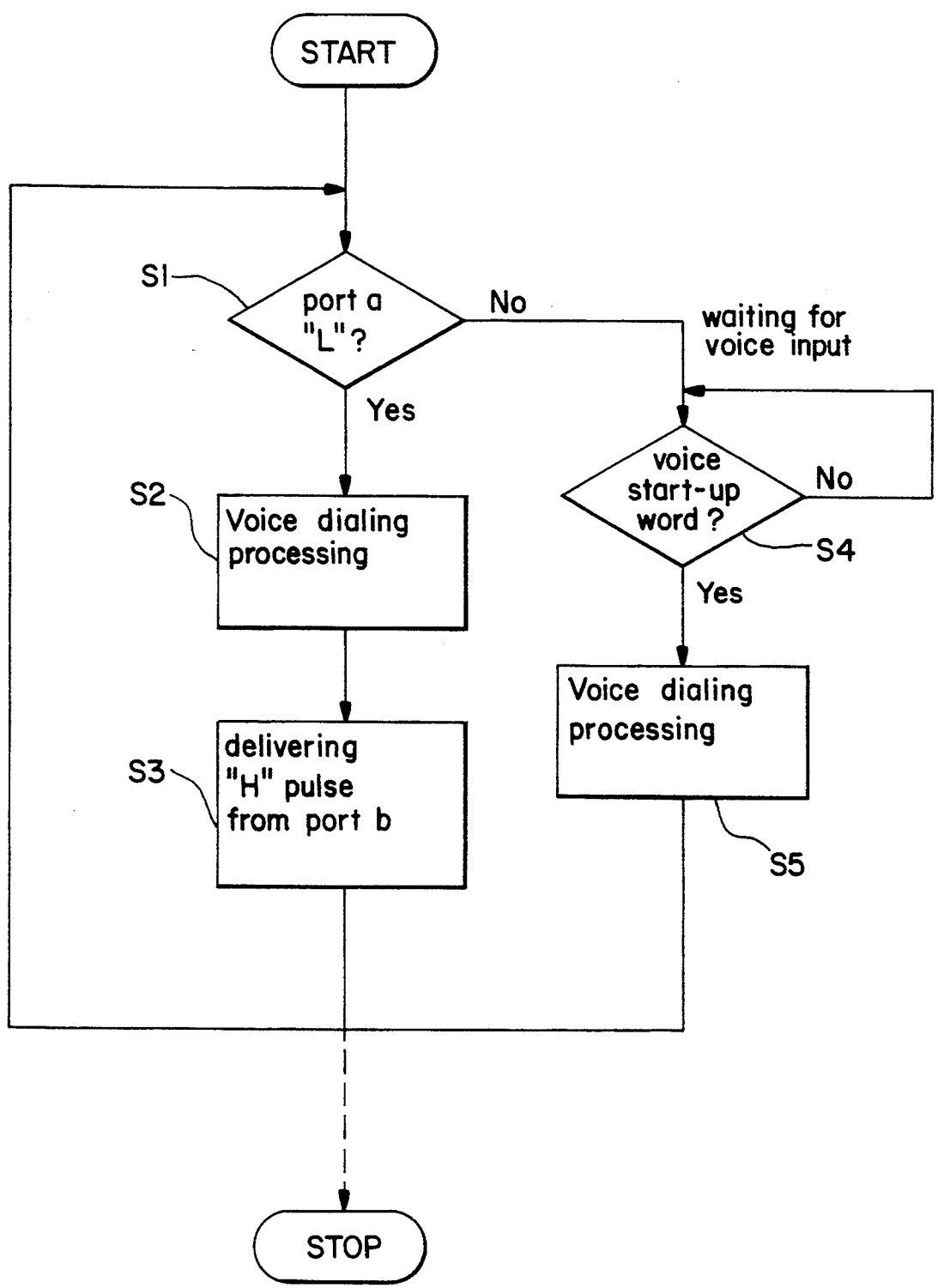

POWER CONSERVING MOBILE TELEPHONE USABLE AS A PORTABLE PHONE AND AS AN INSTALLED PHONE

BACKGROUND OF THE INVENTION

1. Field of the Invention

The present invention relates to a mobile telephone, and in particular to a power supply system of a voice-dialing mobile telephone usable both as an installed telephone and as a portable telephone.

2. Description of the Related Art

With the recent world wide popularization of automobiles, mobile telephones have come into wider use, which in turn has caused the creation of many inventions. Most of these inventions have been intended to ensure safe and reliable use for drivers. In U.S. Pat. No. 4,908,846 issued in 1990, a mobile telephone capable of starting up a call-clear process reliably even when a power switch is depressed by mistake in lieu of a call-end key is disclosed. A drawback of such a mobile telephone has been that a specified key mounted in its operation part has to be depressed and accordingly in order to depress the key, the driver's gaze has to turn to the key from the road, which may cause a dangerous accident to take place. In order to avoid this drawback, the method of starting up a dialing circuit in which a start-up signal is generated from an spoken voice of an isolated word registered previously has been developed. While this method is capable of precluding the above problem in safety, another problem has been encountered that, since the voice dialing circuit has to keep waiting for input of the isolated word assigned to the start-up command, the power source wastes power for the waiting. This power waste is problematic particularly when the mobile telephone is used while receiving a power supply from a built-in battery, because the voice-dialing circuit requires high power consumption on account of high-speed computation.

A mobile telephone is typically constructed to be capable of both being carried outdoors as a portable mobile telephone and being mounted inside the car as an installed mobile telephone, and when it is used as a portable mobile telephone, it receives its power supply from a battery pack. Thus, where the mobile telephone is of the voice dialing type, it is essential to avoid power waste while waiting, i.e., the time which is not spent calling.

SUMMARY OF THE INVENTION

It is an object of the present invention to provide a mobile telephone capable of safely starting up the dialing circuit and also minimizing power loss.

In order to attain the above object, the mobile telephone according to the present invention comprises discrimination means for discriminating the battery currently attached to the voice-dialing telephone unit, voice-dialing means capable of creating a telephone number through speech recognition, the voice-dialing means delivering a reset signal when voice dialing processing ends, provided that the battery pack is attached to the voice-dialing telephone unit, manual start-up means for manually commanding a start-up of the voice-dialing means, provided that the battery pack is attached to the voice-dialing telephone unit, and switching means for electrically connecting the voice-dialing means to the battery pack or the vehicle battery to actuate the voice-dialing means, wherein, in the case that the battery pack is attached to the voice-dialing telephone unit, the switching means turns on in response to the start-up command supplied from the manual start-up means and turns off when the reset signal is supplied from the voice-dialing means, and, in the case that the voice-dialing telephone unit is attached to the vehicle battery, the switching means is retained in the on-state.

With this object, advantages and features of the present invention that may become apparent hereafter, the nature of the present invention will be more clearly understood with reference to the following detailed description of the invention, and the diagrams illustrated in the attached drawings.

BRIEF DESCRIPTION OF THE DRAWINGS

FIG. 1 is a block diagram of a preferred embodiment of the mobile telephone according to the present invention.

FIG. 2 is a flow chart representing the operation of the voice-dialing unit shown in FIG. 1.

DETAILED DESCRIPTION OF THE PREFERRED EMBODIMENT

With reference now to the drawings, FIG. 1 illustrates a block diagram of a preferred embodiment of the mobile telephone according to the present invention. The figure represents the case in which battery pack 1 is attached to voice-dialing telephone unit 20 to supply electric power when the mobile telephone is used as a portable telephone. Battery pack 1 includes battery 5 which supplies a constant voltage to telephone unit 20 through positive source terminal 2 and negative ground terminal 4. Battery pack 1 is further provided with discriminating terminal 3 to deliver a discriminating signal to telephone unit 20. In this embodiment, discriminating terminal 3 is connected to ground terminal 4, and accordingly discriminating terminal 3 provides discriminating signal D of the ground potential-level to telephone unit 20 when battery pack 1 is attached to telephone unit 20, thereby indicating that battery pack 1 is attached to telephone unit 20.

Terminals 2A, 3A and 4A of telephone unit 20 are coupled to source terminal 2, discriminating terminal 3 and ground terminal 4 of battery pack 1 when the battery pack is attached to the telephone unit. When telephone unit 20 is attached to a vehicle battery (not shown), terminals 2A and 4A are coupled to the corresponding electrode terminals of the vehicle battery; however, terminal 3A is not coupled to any of the vehicle battery terminals.

Telephone unit 20 comprises, beside conventional handset 6 and microphone 9, voice-dialing unit 8, a discriminating circuit, a manual start-up circuit, and a switching circuit. Voice-dialing unit 8 has a CPU (not shown) and, supplied with a voice signal from microphone 9, processes speech recognition to create a telephone dialing number, and delivers a reset signal from output port b when voice dialing ends, provided that the CPU judges from discriminating signal D fed to input port a that the battery pack 1 is attached to voice-dialing telephone unit 20. The discriminating circuit is composed of resistor 14 connected between terminals 2A and 3A, and provides discriminating signal D at terminal 3A. Discriminating signal D has the ground potential level (the low level) when battery pack 1 is attached to telephone unit 20 to use the mobile telephone as a portable telephone, and the positive electrode potential level of the vehicle battery (the high level) when the telephone unit is attached to the vehicle battery to use the mobile telephone as an installed telephone. The manual start-up circuit is composed of resistor 15 and key switch 7 mounted on handset 6 connected in series between terminals 2A and 4A, and provides start-up signal U at the junction of resistor 15 and key switch 7. Start-up signal U has the ground potential level (the low level) when key switch 7 is manually depressed, and the positive electrode potential level of the battery pack or vehicle battery (the high level) when key switch 7 is released. PNP transistor 10, NAND gate 12, inverter 13, set/reset flip-flop (hereafter referred to as Set/Rest FF), resistors 17 and 18 constitute a switching circuit for electrically connecting voice-dialing unit 8 to the battery pack or to the vehicle battery to actuate the voice-dialing unit. The discriminating signal inverted by inverter 13 and start-up signal U are applied to inputs of NAND gate 12, which subsequently delivers set signal S to set input of Set/Reset FF 11. To the reset input of Set/Reset FF there is supplied reset signal R from output port b of voice-dialing unit 8. Set/Reset FF 11 provides at its inverted output on/off control signal C which is supplied to the base of PNP switching transistor 10 through resistor 17.

FIG. 2 is a flow chart representing the operation of voice-dialing unit 20.

In operation, when battery pack 1 is attached to telephone unit 20, discriminating signal D takes the low logic level. Detecting discriminating signal D to take the low logic level (Step S1), voice-dialing unit 20 goes to a stand-by state. Since key switch 7 has not yet been depressed at this time, start-up signal U is at the high logic level, and NAND gate 12 does not supply active set signal S of the high logic level. This causes Set/Reset FF 11 to deliver on/off control signal C of the high logic level, allowing PNP switching transistor 10 to be off. When key switch 7 is depressed, start-up signal U turns low, which causes set signal S to be active, allowing PNP switching transistor 10 to turn on and actuate voice-dialing unit 8. Thus, start-up of voice-dialing processing is effected by means of the manual depression of key switch 7 (Step S2). When voice-dialing unit 8 finishes the voice-dialing process, it delivers reset signal R of the high logic level from output port b to Set/Reset FF, and resets Set/Reset FF to provide on/-off control signal C of the high level, allowing the PNP switching transistor to be off again (Step S3). Voice-dialing unit 8 is now in the stand-by state.

In Step S1, in the case that discriminating signal D is at the high logic level, i.e., the telephone unit is attached to the vehicle battery, NAND gate 12 supplies an active set signal, regardless of the logic level of start-up signal U, causing PNP switching transistor to be on. Since discriminating signal D fed to port a of voice-dialing unit 8 is at the high logic level, voice-dialing unit 8 does not deliver a reset signal R. Thus, voice-dialing unit 8 is always kept supplied with an electric power from the vehicle battery, enabling start-up of the voice dialing process without any manual operation. Start-up is effected through a voice start-up signal corresponding to an isolated word assigned to the start-up command (Step S4), followed by voice-dialing processing (Step S5).

In this way, the mobile telephone described above is capable of both starting up the voice-dialing processing through manually operating a key switch when the battery pack is attached to the voice-dialing telephone unit to use the mobile telephone as a portable telephone, and keeping the voice-dialing unit in a state ready for input of the voice start-up signal by keeping the vehicle battery switched on to the voice-dialing unit when the mobile telephone is used as an installed telephone, thereby preventing an accident arising from manual operation of the start-up key while driving an automobile. It will be appreciated that, when the mobile telephone is used as a portable telephone, the power consumption of the battery pack takes place exclusively during the period from the time the key switch is manually depressed to the time the voice dialing processing ends.

It is to be understood that variations and modifications of the mobile telephone disclosed herein will be evident to those skilled in the art. It is intended, however, that all such variations and modifications be included within the scope of the appended claims.

What is claimed is:

1. A mobile telephone comprising:
a voice-dialing telephone unit and a battery pack, usable both as a portable telephone when the battery pack is attached to the voice-dialing telephone unit and as an installed telephone when the voice-dialing telephone unit is attached to a vehicle battery;
discrimination means for discriminating the battery pack currently attached to the voice-dialing telephone unit;
voice-dialing means for creating a telephone number through speech recognition, the voice-dialing means delivering a reset signal when voice dialing processing ends, provided that the battery pack is attached to the voice-dialing telephone unit;
manual start-up means for manually commanding a start-up of the voice-dialing means, provided that the battery pack is attached to the voice-dialing telephone unit; and
switching means for electrically connecting the voice-dialing means to the battery pack or to the vehicle battery to actuate the voice-dialing means, wherein, when the battery pack is attached to the voice-dialing telephone unit, the switching means turns on in response to a start-up command supplied from the manual start-up means and turns off when the reset signal is supplied from the voice-dialing means, and, when the voice-dialing telephone unit is attached to the vehicle battery, the switching means is retained in the on-state,
wherein attaching the battery pack to the voice-dialing telephone unit, or the voice-dialing telephone unit to the vehicle battery is effected with first and second terminals of the voice-dialing telephone unit being electrically connected to first and second electrodes of the battery pack or vehicle battery respectively, and the discriminating means comprises a center tap provided in the battery pack having a predetermined potential with respect to the first or second electrode of the battery pack, a discriminating-signal terminal provided in the voice-dialing telephone unit, which couples with the terminal of the center tap when the battery pack is attached to the voice-dialing telephone unit, but does not couple with any electrode terminal in the vehicle battery when the voice-dialing telephone unit is attached to the vehicle battery, and a first resister connected between the first and discriminating-signal terminals of the voice-dialing telephone unit, whereby the discriminating means provides at the discriminating-signal terminal a discriminating signal of a first logic level corresponding to the potential of the center tap when the battery pack is attached to the voice-dialing telephone unit, and provides a discriminating signal of a second logic level corresponding to the potential of the first electrode of the vehicle battery.

2. A mobile telephone comprising:

a voice-dialing telephone unit and a battery pack, usable both as a portable telephone when the battery pack is attached to the voice-dialing telephone unit and as an installed telephone when the voice-dialing telephone unit is attached to a vehicle battery;

discrimination means for discriminating the battery pack currently attached to the voice-dialing telephone unit;

voice-dialing means for creating a telephone number through speech recognition, the voice-dialing means delivering a reset signal when voice dialing processing ends, provided that the battery pack is attached to the voice-dialing telephone unit;

manual start-up means for manually commanding a start-up of the voice-dialing means, provided that the battery back is attached to the voice-dialing telephone unit; and switching means for electrically connecting the voice-dialing means to the battery pack or to the vehicle battery to actuate the voice-dialing means, wherein, when the battery pack is attached to the voice-dialing telephone unit, the switching means turns on in response to a start-up command supplied from the manual start-up means and turns off when the reset signal is supplied from the voice-dialing means, and, when the voice-dialing telephone unit is attached to the vehicle battery, the switching means is retained in the on-state, wherein attaching the battery pack to the voice-dialing telephone unit, or the voice-dialing telephone unit to the vehicle battery is effected with first and second terminals of the voice-dialing telephone unit being electrically connected to first and second electrodes of the battery pack or vehicle battery, respectively, and the manual start-up means comprises a resistor and a manually operable switch connected in series between the first and second terminals of the voice-dialing telephone unit, whereby a start-up signal indicative of start-up of the voice-dialing means is provided at the junction series between the first and second terminals of the voice-dialing telephone unit, whereby a start-up signal indicative of start-up of the voice-dialing means is provided at the junction of the resistor and the switch when the switch is manually operated to activate the manual start-up means, provided that the battery pack is attached to the voice-dialing telephone unit.

3. A mobile telephone as claimed in claim 2, wherein the switching means comprises a switching transistor for connecting the voice-dialing means to the battery pack or the vehicle battery in response to an on/off control signal, a set/reset flip-flop for providing the on/off control signal, which is reset by the reset signal supplied from the voice-dialing means, and gate means for providing a set signal to the set/reset flip-flop, the gate means delivering the set signal either when both the battery pack is attached to the voice-dialing telephone unit and the start-up signal is supplied from the manual start-up means, or when the voice-dialing telephone unit is attached to the vehicle battery, the set/reset flip-flop delivering an on/off signal when it receives the set signal and stopping output of the on/off signal when it receives the reset signal.

* * * * *